| United States Patent [19] | [11] 3,892,782 |
|---|---|
| Buchi | [45] July 1, 1975 |

[54] PROCESS FOR THE PREPARATION OF 2-(HEX-3-CIS-EN-1-YL)-5-METHYL-FURAN

[75] Inventor: George H. Buchi, Cambridge, Mass.

[73] Assignee: Firmenich S.A., Geneva, Switzerland

[22] Filed: July 12, 1974

[21] Appl. No.: 488,073

[52] U.S. Cl.......................................... 260/346.1 R
[51] Int. Cl................................................ C07d 5/16
[58] Field of Search ............................. 260/346.1 R

[56] References Cited
OTHER PUBLICATIONS

Crombie et al., J. Chem. Soc. (C), (1969), p. 1024–1027.
Buchi et al., J. Org. Chem., Vol. 31, p. 977 (1966).
Shishido et al., Chem. Abstr., Vol. 73, 120181p (1970).
Shishido et al., Chem. Abstr., Vol. 77, 88724n, (1972).
Shishido et al., Chem. Abstracts, Vol. 77, 1972, 62176 K Primary Examiner—Henry R. Jiles
Assistant Examiner—Bernard I. Dentz
Attorney, Agent, or Firm—Pennie & Edmonds

[57] ABSTRACT

2-[Hex-3-cis-en-1-yl]-5-methyl-furan which is a key intermediate in the preparation of cis-jasmone, a perfume principle of jasmin oil, can be prepared in high yield starting from 5-methyl-furfural via the formation of 2-[1-hydroxy-but-3-yn-1-yl]-5-methyl-furan and 2-[hex-3-yn-1-yl]-5-methyl-furan.

4 Claims, No Drawings

PROCESS FOR THE PREPARATION OF 2-(HEX-3-CIS-EN-1-YL)-5-METHYL-FURAN

BACKGROUND OF THE INVENTION

Various processes have been proposed in the chemical literature for the synthesis of cis-jasmone, the naturally occurring isomer which is found in the volatile portion of jasmin flowers.

This compound was discovered as early as 1899 by Hesse and Muller [Ber., 32, 565, 765 (1899)], but its structure was first elucidated by Treff and Werner [Ber., 66, 1521, 3579 (1933)].

These authors achieved in 1935 the first successful synthesis starting from hex-3-en-1-ol [cf. Ber., 68B, 640 (1935)]. Most of the processes described since they involve, as a last step, the cyclisation of cis-undec-8-en-2,5-dione [cf. e.g. J. Org. Chem., 31, 977 (1966); La France et ses Parfums, 12, 330 (1969); J. Chem. Soc., [C], 1024 (1969); Tetrahedron Letters, 1569 (1971); Tetrahedron Letters, 2575 (1971)].

It is known that the hydrolysis of furans, according the hereinbelow reaction scheme, is a method of choice for preparing 1,4-diketones Scheme 1

This synthetic route was for example followed by Hunsdieker [Ber., 75, 460 (1942)] and later on by Zefirov et al. [Zh. Obshei Kimii, 34, 1069 (1964)]. These latter authors carried out the addition of 2-methyl-furan to acrolein followed by a Wittig coupling of the obtained furan derivative with n-propyl-triphenyl-phosphonium bromide — see hereinbelow reaction scheme—.

Scheme 2

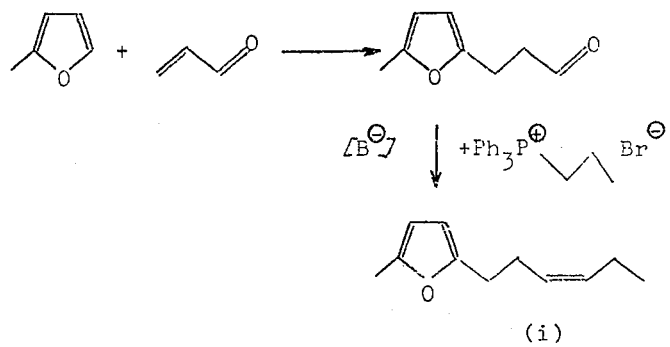

Unfortunately, the Wittig reaction promotes the formation of mixtures of both the cis and trans isomers of compound (i), though the isomeric cis/trans ratio in the obtained mixtures can favorably be influenced by operating in accordance with special techniques [Zefirov et al., op. cit.; Crombie et al., J. Chem. Soc. [C], 1, 1025 (1969), Fetizon and Chalbar, La France et ses Parfums, 57, 330 (1969)].

Furan (i) was equally synthesized by Buchi and Wuest [cf.: J. Org. Chem., 31, 977 (1966)] by direct alkylation of the lithium derivative of 2-methyl-furan with cis-pent-3-enyl bromide, according to the following reaction scheme.

Scheme 3

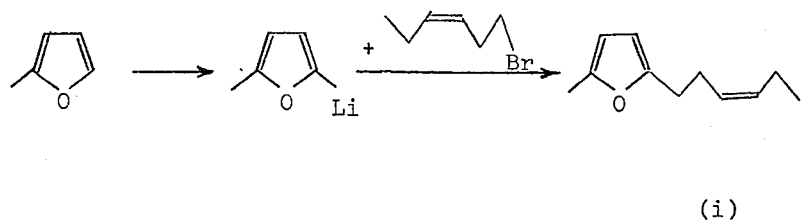

In this case also, the product obtained consisted in a mixture comprising cis and trans isomers, their ratio depending on the isomeric composition of the starting alkenyl bromide.

Another synthetic route was described by Sisido et al. [cf. Perf. and Ess. Oil Rec., 30, 364 (1966)]. This synthesis uses 5-methyl-furfuryl alcohol as starting material which is then converted by a 4 step synthesis into the acetylenic 2,5-dione of formule (ii), see reaction scheme 4.

Scheme 4

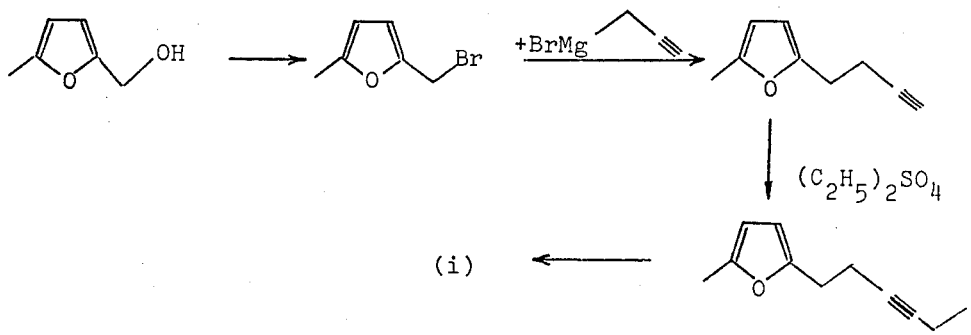

In spite of the prior known methods the preparation of cis-jasmone on an industrial scale still presents problems.

The present invention relates to a novel solution of the problem of synthetizing 2-[hex-3-cis-en-1-yl]-5-methyl-furan- the compound of formula (i) -. It has now been discovered that said compound can be easily and economically prepared starting from 5-methyl-furfural according to a process which comprises a. reacting 5-methyl-furfural with a propargyl-magnesium halide;
b. hydrolysing the thus obtained compound to give 2-[1-hydroxy-but-3-yn-1-yl]-5-methyl-furan;
c. converting the said hydroxy derivative into a corresponding ether;
d. reacting the resulting ether with an alkali metal in the presence of liquid ammonia and then adding ethyl bromide to the thus formed compound to give 2-[hex-3-yn-1-yl]-5-methyl-furan; and e. partially reducing the triple bond of the resulting acetylenic derivative by catalytic hydrogenation to give 2-[hex-3-cis-en-1-yl]-5-methyl-furan.

PREFERRED EMBODIMENTS OF THE INVENTION

According to a preferred embodiment of the present invention, 5-methyl-furfural is converted into 2-[1-hydroxy-but-3-yn-1-yl]-5-methyl-furan by reacting it with propargyl-magnesium bromide. This reagent is easily obtained by the reaction between propargyl-bromide and magnesium metal in accordance with the usual technique applied for the Grignard reactions, preferably in solution in an ether, such as a dialkyl ether, e.g. diethyl ether, tetrahydrofuran or a mixture of tetrahydrofuran and a dialkyl ether.

The subsequent formation of 2-[1-hydroxy-but-3-yn-1-yl]-5-methyl-furan is achieved by a hydrolysis of the product obtained, e.g. in a saturated aqueous solution of ammonium chloride.

The conversion of 2-[1-hydroxy-but-3-yn-1-yl]-5-methyl-furan into its corresponding ether derivative, can be effected by reacting, according to the usual technique, the hydroxy compound with a vinylic ether. Suitable vinylic ethers include reagents such as dihydropyran or vinyl-ethyl-ether, which enable the formation of 2-[1-tetrahydropyranoxy-but-3-yn-1-yl]-5-methyl-furan and 2-[1-(3-oxa-pentoxy)-but-3-yn-1-yl]-5-methyl-furan, respectively.

The further reaction of the resulting ether with an alkali metal is carried out in solution in liquid ammonia. This reaction is effected according to the usual techniques applied for the Birch type reactions. This treatment with an alkali metal, preferably sodium or lithium, is followed by an alkylation by means of ethyl bromide. Said alkylation is carried out at low temperature, preferably at a temperature lower than 0°C, more preferably at about −50°/−70°C. The completion of the reaction is however effected by slow warming up of the reaction mixture and by eventually refluxing it during a few hours. It has to be appreciated that the reaction time depends particularly on the type of reaction vessel employed and, especially, on the volume of the mixture treated.

Finally, the partial reduction of the acetylenic triple bond of the obtained 2-[hex-3-yn-1-yl]-5-methyl-furan to give 2-[hex-3-cis-en-1-yl]-5-methyl-furan is effected by a catalytic hydrogenation in the presence of Lindlar type catalysts [Helv. Chim. Acta, 35, 446 (1952); Org. Synth., 46, 89 (1966)].

5-Methyl-furfural, used as starting material in the above described process of the invention, is an easily available commercial product. The process of the present invention is illustrated by the following reaction scheme:

Scheme 5

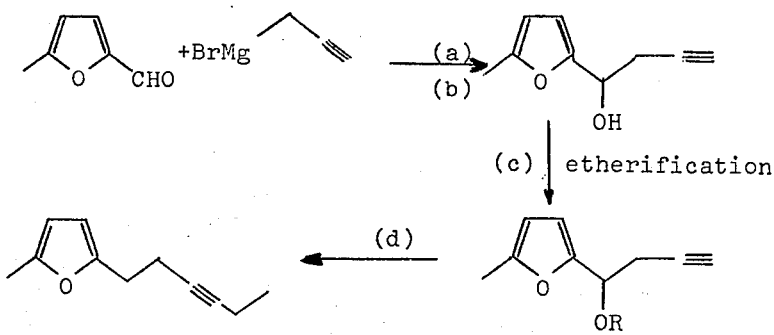

(e)

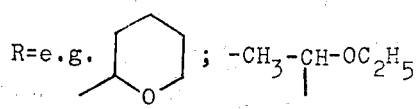

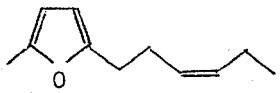

(i)

The invention is better illustrated by the following examples wherein the temperatures are indicated in degrees centigrade and the abbreviations have the meaning common in the art.

EXAMPLE a. 2-[1-Hydroxy-but-3-yn-1-yl]-5-methyl-furan

In a 2 liter flask equipped with mechanical stirrer, condenser, thermometer and dropping funnel were placed 27.4 g magnesium turnings (1.12 g atoms) and one small crystal of mercuric chloride. The equipment was dried in vacuo and then placed under a nitrogen atmosphere. A solution of 89 g (0.75 mol) freshly distilled propargyl bromide in 750 ml of dry ethyl ether was placed in the dropping funnel. The magnesium was covered with this halide solution. After the reaction had started, the rest of the solution was added within 40 min. at reflux temperature. The Grignard solution was stirred 1 hour longer at room temperature and then cooled to −20°. A solution of 62.6 g (0.57 mol) of 5-methyl-2-furfural (freshly distilled) in 400 ml dry tetrahydrofuran was added dropwise over an one hour period with vigorous stirring. The mixture was allowed to warm up to room temperature and after 1 hr 120 ml of saturated ammonium chloride solution was added dropwise under external cooling. The mixture was poured into 2 liters of water and the organic layer was separated. The organic layer was washed with water, dried over anhydrous $Na_2SO_4$ and evaporated. The remaining oily residue was dried for 3 hr at 30° (0.1 mm Hg) to give 83.2 g of 2-[1-hydroxy-but-3-yn-1-yl]-5-methyl-furan.

IR (liqd film)

: 3400(broad s), 3315(a), 2940(m), 2125(w), 1615(w) 1570(m), 1430(m), 1390(m), 1330(w), 1230(s), 1170(sh), 1050(sh), 1020(s), 990(sh), 970(m), 950(m), 940(m), 920(w), 855(m), 790(s), 725 cm$^{-1}$(w).

NMR ($CCl_4$)

: 1.9(m, 1H), 2.23(s, 3H), 2.55, 2.60 (two d, J = 6.5 Hz, 2H), 3.7(d, J = 5.5 Hz, 1H), 4.62(broad quartet, 1H), 5.83(m, 1H); 6.10(broad d, 1H) δ ppm.

b.

2-[1-Tetrahydropyranoxy-but-3-yn-1-yl]-5-methyl-furan

The crude carbinol obtained according to (a) (83.2 g) and 75.0 g of dihydropyran were stirred in an ice bath under nitrogen. p-Toluenesulfonic acid monohydrate (180 mg) was added. The mixture was stirred in the ice bath for 30 min., then at room temperature overnight. The mixture was poured into ice water and extracted twice with 200 ml portions of ether. The combined ether layers were washed with 100 ml of saturated sodium bicarbonate solution and water. The organic layer was dried over anhydrous $Na_2SO_4$ and evaporated. The residue was distilled (short path apparatus) giving 115.0 g of pure 2-[1-tetrahydropyranoxy-but-3-yn1-yl]-5-methyl-furan as a pale yellow oil (86.5% based on 5-methyl-2-furfural) at 81°–86°/0.1 mm Hg.

IR (liqd film)

:
3315(m), 2960(s), 2940(sh), 2875(m) 2860(m), 2125(w), 1585(m), 1435(w), 1430(m), 1425(m), 1390(w), 1350(w), 1330(w), 1320(w), 1290(w), 1280(w), 1260(w), 1240(w), 1225(m), 1205(s), 1185(m), 1155(w), 1135(s), 1120(s), 1080(s), 1040(s), 1020(s), 980(s), 940(w), 920(w), 905(m), 870(m), 805(w), 785(m), 735 cm$^{-1}$(w).

NMR ($CCl_4$)

: 1.6(broad, 6H), 1.87(t, J=2.5Hz, 1H), 2.27(s, 3H), 2.60, 2.75(two t, J=2.5 Hz, 2H), 3.2–4.2(m, 2H), 4.5–5.0(m, 2H), 5.9 and 6.2 (two m, 2H) δ ppm.
By replacing in the above reaction dihydropyran with vinyl-ethyl-ether, and using the same molar ratio relative to the starting carbinol, analogous results were observed, 2-[1-(3-oxa-pentoxy)-but-3-yn-1-yl]-5-methyl-furan was obtained instead.
B.p. 80°–7°/0.1 mm Hg.

c. 2-[Hex-3-yn-1-yl]-5-methylfuran

A two liter flask quipped with a dry ice condenser, thermometer and mechanical stirrer was dried in vacuo, placed under nitrogen, then one liter of liquid ammonia was introduced into the system by distillation from the cylinder. Sodium (9.2 g, 0.4 g atoms) was added in portions until the blue color had changed to gray (a trace of ferric-nitrate had been added to catalyze amide formation). The solution was cooled to approx. −70° with a dry ice-acetone bath, then the system was flushed with nitrogen and maintained under positive nitrogen pressure. A solution of the tetrahydropyranoxy ether derivative prepared according to (b) (46.9 g, 0.2 mol) in 175 ml of dry tetrahydrofuran was added. The mixture was stirred 10 minutes at −70°, then 13.8 g sodium (0.6 g atoms) were added portionwise, then stirred 30 min. longer at approx. −70° (color still blue), then 131.0 g of ethyl bromide (1.2 mol) were added dropwise at −70°, slowly at first until the blue color was discharged. The solution was stirred 1 hr longer at −70° (color white), then 3 hr at reflux. The ammonia was then allowed to escape through the drying tube while stirring overnight. To the residue were added 700 ml of water. The mixture was extracted with three 300 ml portions of pentane. The combined organic layers were washed with water, dried over anhydrous $Na_2SO_4$ and evaporated. The residue was distilled under reduced pressure (40°–46°/0.15 mm Hg) giving 27.3 g of colorless liquid (84.5%) which was constituted mostly by the desired acetylenic furan.

IR (liqd film)

: 3115(w), 2980(s), 2925(s), 2880(m), 2850(m), 1650(broad w), 1620(m), 1570(s), 1450(s), 1430(s), 1385(m), 1340(w), 1320(s), 1260(w), 1220(s), 1150(w), 1060(w), 1020(s), 960(w), 930(m), 775(s)cm$^{-1}$.

NMR (CCl$_4$)

: 1.08t, J=7 Hz, 3H), 1.9–2.9 (m plus singlet at 2.22, 9H), 5.80(m, 2H) δ ppm.

d. 2(Hex-cis-3-enl-yl)-5-methylfuran

To a solution of the acetylenic derivative obtained sub (c) (4.86 g) in 100 ml of hexane were added 100 mg of Lindlar catalyst [Helv. Chim. Acta, 35, 446 (1952)]. This solution was hydrogenated at atmospheric pressure until hydrogen absorption practically ceased. The solution was filtered and the filtrate evaporated. The colorless liquid residue was distilled under reduced pressure (82°–83°/9 mm Hg) to give 4.9 g (100%) of colorless product. The IR and NMR spectra were identical to those of the previously reported product [G. Büchi and H. Wüest, J. Org. Chem., 31, 977 (1966)].

What is claimed is:

1. A process for the preparation of 2-[hex-3-cis-en-1-yl]-5-methyl-furan, which comprises:
   a. reacting 5-methyl-furfural with a propargyl-magnesium halide;
   b. hydrolysing the thus obtained compound to give 2-[1-hydroxy-but-3-yn-1-yl]-5methyl-furan;
   c. converting the said hydroxy derivative into a corresponding ether;
   d. reacting the resulting ether with an alkali metal in the presence of liquid ammonia and then adding ethyl bromide to the thus formed compound to give 2-[hex-3-yn-1-yl]-5-methyl-furan; and
   e. partially reducing the triple bond of the resulting acetylenic derivative by catalytic hydrogenation to give 2-[hex-3-cis-en-1-yl]-5-methyl-furan.

2. A process according to claim 1, wherein the propargyl-magnesium halide is propargyl-magnesium bromide.

3. A process according to claim 1, wherein 2-[1-hydroxy-but-3-yn-1-yl]-5-methyl furan is converted into 2-[1-tetrahydro-pyranoxy-but-3-yn-1-yl]-5-methyl-furan or 2-[1-(3-oxa-pentoxy)-but-3-yn-1-yl]-5-methyl-furan.

4. Process according to claim 1, wherein the addition of ethyl bromide is effected at a temperature comprised between about −50° and −70°C.

* * * * *

UNITED STATES PATENT AND TRADEMARK OFFICE
CERTIFICATE OF CORRECTION

PATENT NO. : 3,892,782
DATED : July 1, 1975
INVENTOR(S) : George H. Buchi

It is certified that error appears in the above-identified patent and that said Letters Patent are hereby corrected as shown below:

In Column 3, lines 35 and 36 "bromide to the thus formed compound to give 2-[hex-3-yn-1-yl]-5-methyl-furan; and"

should be

-- bromide to the thus formed compound to give 2-[hex-3-yn-1-yl]-5-methyl-furan; and
e) partially reducing the triple bond of the resulting --.

In Column 4, line 1, please delete "e. partially reducing the triple bond of the resulting".

In Column 5, line 41, "over an one" should be --over a one--.

Signed and Sealed this second Day of December 1975

[SEAL]

Attest:

RUTH C. MASON
Attesting Officer

C. MARSHALL DANN
Commissioner of Patents and Trademarks